United States Patent [19]

Willmore

[11] Patent Number: 5,351,303
[45] Date of Patent: Sep. 27, 1994

[54] INFRA-RED IMAGING AND PATTERN RECOGNITION SYSTEM

[76] Inventor: Michael R. Willmore, 144 Meadow Dr., Leonardtown, Md. 20650

[21] Appl. No.: 22,104

[22] Filed: Feb. 25, 1993

[51] Int. Cl.$^5$ .............................................. G06K 9/00
[52] U.S. Cl. ...................... 382/2; 250/495.1; 340/825.34
[58] Field of Search ............... 382/4, 5, 58, 65, 2; 356/71, 388; 340/825.34; 250/504 R, 495.1

[56] References Cited

U.S. PATENT DOCUMENTS

| | | | |
|---|---|---|---|
| 4,048,618 | 9/1977 | Hendry | 382/4 |
| 4,414,684 | 11/1983 | Blonder | 382/4 |
| 4,582,985 | 4/1986 | Löfberg | 382/4 |
| 4,636,622 | 1/1987 | Clark | 235/380 |
| 4,687,526 | 8/1987 | Wilfert | 156/64 |
| 4,783,167 | 11/1988 | Schiller et al. | 382/4 |
| 4,785,171 | 11/1988 | Dowling, Jr. et al. | 382/4 |
| 4,879,455 | 11/1989 | Butterworth et al. | 235/380 |
| 4,896,363 | 1/1990 | Taylor et al. | 382/5 |
| 4,983,036 | 1/1991 | Froelich | 356/71 |
| 4,995,081 | 2/1991 | Leighton et al. | 386/23 |
| 4,995,086 | 2/1991 | Lilley et al. | 382/4 |
| 5,103,486 | 4/1992 | Grippi | 382/4 |
| 5,163,094 | 11/1992 | Prokoski et al. | 382/2 |
| 5,222,153 | 6/1993 | Beiswenger | 356/71 |
| 5,239,590 | 8/1993 | Yamamoto | 382/5 |

*Primary Examiner*—Joseph Mancuso
*Attorney, Agent, or Firm*—Dennison, Meserole, Pollack & Scheiner

[57] ABSTRACT

The system of the present invention senses and compares the unique Infra-Red (IR) image pattern from an individual's finger to another IR image pattern of the same finger stored within memory components of the system. Special purpose processors within the system compare the two image patterns and determine if one pattern is a duplicate of the another. If so, the system becomes "enabled", verifying an individual attempting to use the transaction media is the only one having authorization to do so.

10 Claims, 2 Drawing Sheets

INFRA-RED IMAGING AND PATTERN RECOGNITION SYSTEM

BACKGROUND OF THE INVENTION

FIELD OF THE INVENTION

The present invention relates to an identity verification device for use with transaction media. More specifically, the system of the present invention eliminates the mechanism used to perpetrate fraudulent and unauthorized use of transaction systems.

The illegal use and receipt of services from a transaction system constitutes a type of criminal offense commonly referred to as transaction fraud. As a national problem, transaction fraud costs consumers, financial institutions, federal, state, and local governments many billions of dollars each year. Eventually, all these costs are passed back to the consumer in the form of higher prices, higher interest rates, and increased taxes.

The principle mechanism used to perpetrate transaction fraud revolves around the use of transaction media. Transaction media are supposed to identify the individual in possession of the media and confirm they have authorization to exchange services from a particular transaction system. Stated another way, transaction media are supposed to answer both parts of the question, "Are you who you say your are and do you have authorization to use this transaction system?".

The appearance of most transaction media will normally exhibit some measure of authority for an individual to use a transaction system. Common forms of transaction media will identify the specific transaction system (e.g. Visa, American Express, etc.), an individual's name, and an account number, at a minimum. By doing so, the appearance of the transaction media will, as a minimum, exhibit an answer to the latter portion of this question.

However, the mere possession of a transaction media will seldom, if ever, exhibit an attribute of personal uniqueness sufficient to confirm the identity of an individual in possession of the media. This leaves the first part of the question unanswered and, in turn, prevents the latter portion of the question to be answered with certainty. The mechanism for perpetrating transaction fraud revolves around this uncertainty in identity verification as demonstrated by transaction media.

A solution to the problem of transaction fraud involves eliminating this mechanism. This requires finding means to verify the individual in possession of a transaction media is, in fact, the same person who has been given authorization to use the media. But, unless the identity verification is also used for enabling the transaction media to interface with a corresponding transaction device, the mechanism for perpetrating transaction fraud will remain intact.

Many innovations from the prior art have suggested methods for solving the problem of transaction fraud. These innovations have included, among others, the use of secret codes, Personal Identification Numbers (PINs), fingerprints, and photographs with transaction media. Some of these solutions have proven to be either too expensive or too cumbersome for implementing on a large scale. Others have simply made the crime of transaction fraud more difficult to perpetrate. Few, if any, have yet to succeed in eliminating the problem altogether.

Secret codes and PIN numbers for one individual, as described in U.S. Pat. No. 4,995,081, and U.S. Pat. No. 4,879,455, as examples, can be stolen, given away, discovered, bought, or even sold to someone else. In many instances, the PIN or secret code belonging to one individual can be guessed and used by another person having illegally acquired the transaction media belonging to someone else. Consequently, innovations of this sort do not require a linkage between personal uniqueness and identity verification with an authorization to use a transaction system. As a result, secret codes and PIN numbers have not eliminated the mechanism used for perpetrating transaction fraud.

Personal photographs on transaction media, as described in U.S. Pat. No. 4,687,526, do address the issue of personal uniqueness. However, photographs do not always reflect the current appearance of an individual and can often be altered or exchanged directly on the media itself. Like secret codes and PIN numbers, photographs also do not establish a linkage between identity verification and authorization to use a transaction system, especially in the case of automated transaction systems. Consequently, and although using personal photographs on transaction media may serve to mitigate the crime of transaction fraud, photographs will not eliminate the mechanism used to perpetrate transaction fraud.

Fingerprints are most often regarded as the method of choice for verifying personal identity in conjunction with the use of transaction media. The prior art contains several variations on the theme of using fingerprint identification systems. U.S. Pat. No. 4,636,622, U.S. Pat. No. 4,983,036, and U.S. Pat. No. 4,896,363 are typical examples of such innovations.

Automated fingerprint identification systems, however, are expensive to procure, use, and maintain for large population segments. In addition, consumers are opposed to allowing such personal information as their fingerprints to reside within some non-criminal or non-security related system. This is considered to be an invasion of personal privacy.

Other analysis of innovations from the prior art reveals similar themes toward the inclusion of methods that remain specific to the transaction media but not unique to the individual in possession of the media. Still further analysis of the prior art reveals these innovations neglect to consider the transaction media to transaction device interface. A solution to the problem of transaction fraud must consider not only these deficiencies in the prior art but also a range of other requirements necessary to both eliminate the mechanism used to perpetrate this type of crime and do so in a cost effective manner. A summary of these requirements are as follows:

1. An attribute of personal uniqueness must be used with the transaction media that cannot be duplicated, given away, forgotten, stolen, worn off, tampered with, transferred, or used by any other individual.
2. A solution must control the transaction media to transaction device interface based upon the identity verification process, not upon the action of an individual in possession of the transaction media.
3. A solution must be simple to operate, be accurate, and reliable.
4. A solution must not inconvenience the consumer or portend to be an invasion of the consumer's personal privacy.

5. A solution must be affordable and flexible enough to be used in a variety of transaction media and with a variety of corresponding transaction device and system configurations.

The form, fit, and function of the present invention is designed to meet the requirements stated. Herein also lies the essential differences between innovations from the prior art and the present invention as heretofore described.

SUMMARY OF THE INVENTION

An Infra-Red (IR) imaging and pattern recognition system is disclosed. The system of the present invention involves a plurality of components that will accomplish two primary objectives. First, the system of the present invention will positively verify the identity of an individual(s) in possession of a transaction media as being the only person(s) authorized to use the transaction media. Second, the system of the present invention will create an electronic interface between a transaction media and a transaction device only upon verification of the individual(s) identity thereby confirming authorization for the individual to use the transaction media does exist. As the system of the present invention accomplishes both objectives, the mechanism for perpetrating transaction fraud will be eliminated.

An objective of the present invention is to verify the individual in possession of a transaction media is, in fact, the same individual who has been given authorization to exchange services with a transaction system. As the present invention verifies an individual's identity and authorization to use a transaction media, so also does it enable an electronic interface to be completed between the transaction media and a corresponding transaction device. The present invention will permit data or other information to be exchanged between an individual in possession of the transaction media and the transaction device only if this interface is created. In this manner, the present invention will ensure only those individuals who have been given authorization to use the transaction media are allowed to exchange or receive services from a transaction system. Accordingly, the system of the present invention will eliminate the mechanism used to perpetrate transaction fraud.

In describing the system of the present invention, the terms "transaction media" and "transaction device" identify the essential elements of a complete "transaction system". Transaction systems are designed to use a specific type of transaction media in conjunction with an equally specific type of transaction device to distribute or exchange services with an authorized recipient.

The system of the present invention is applicable to the domain of all transaction systems. Examples within this domain of transaction media include, but are not limited to, such transaction media as credit cards, computer keyboards, security access badges, Automatic Teller Machines (ATM) cards, etc. Examples of transaction devices within the same domain include, with respect to these examples of transaction media, credit card imprint devices, computer processing equipment, access control devices, ATM transaction devices, etc.

The system of the present invention senses and compares the unique Infra-Red (IR) image pattern from an individual's finger to another IR image pattern of the same finger stored within memory components of the system. Special purpose processors within the system compare the two image patterns and determine if one pattern is a duplicate of the another. If so, the system becomes "enabled", verifying an individual attempting to use the transaction media is the only one having authorization to do so.

The enablement also permits an electronic interface to be established between the transaction media and a transaction device. This electronic interface permits an exchange of information to take place between the transaction media and the transaction device. Thus, the electronic interface provides a physical link between the confirmation of an individual's identity and authorization for the individual to receive services from a transaction system. The electronic interface between the transaction media and the transaction device becomes disabled if either an enabled transaction media is not coupled to a transaction device within a short period of time or the physical coupling is removed after the media has been enabled.

Accordingly, it is an object of the present invention to include an identity verification device directly within a transaction media so that disadvantages of the prior art will be avoided.

Another object of the present invention is for this identity verification device to establish and control an electronic interface between the transaction media and a corresponding transaction device based upon the achievement of the identity verification objective.

Further objects and advantages of the invention will become apparent from a consideration of the drawings and ensuing descriptions.

LIST OF COMPONENT TYPES IDENTIFIED IN THE DRAWINGS

The following list of component types and manufacturers would be used to build the device. However, all components could be assembled into an Application Specific Integrated Circuit (ASIC) and Surface Mounted onto the appropriate transaction media or assembled in any one of several other transaction media/device configurations.

SYSTEM OPERATING DIAGRAM

10 - IRCCD; OEM MANUFACTURERS SUCH AS SARNOFF, CLEVELAND ELECTRONICS, ETC.

11 - System On/Off Logic—SIMPLE AND/OR LOGIC GATES, INTEGRATED CIRCUIT COMPONENTS (MANY AVAILABLE AT RADIO SHACK)

12 - System Management Processor—SPECIAL PURPOSE PROCESSORS SUCH AS THOSE MADE BY SCI CORPORATION AND IBM 13 - Power Supply—DC BATTERIES SUCH AS THOSE MADE BY DELCO, DURACELL 14 - Image Processor—OEM SUPPLIED WITH IRCCD 15 - Memory Routing Logic—LOGIC CIRCUITS 16 - M×N Image Memory—(INTEGRATED CIRCUIT COMPONENTS)

17 - J×K Image Memory—(INTEGRATED CIRCUIT COMPONENTS)

18 - Pattern Recognition Processor—SPECIAL PURPOSE PROCESSOR
19 - Image Matching Logic—SPECIAL PURPOSE PROCESSOR
20 - Interface Control Processor—SPECIAL PURPOSE PROCESSOR
21 - Timer—SIMPLE RC TIMER CIRCUIT (RADIO SHACK)
22 - Media Data—AS APPLICABLE
23 - Transaction Device—AS APPLICABLE
PHYSICAL APPEARANCE OF AN INSTALLED DEVICE
23 - Transaction Device
24 - Transaction Media
25 - Physical Arrangement
26 - System To Media Data Connection
27 - System To Transaction Device Interface Connection

DESCRIPTION OF THE INVENTION

Figure 1:
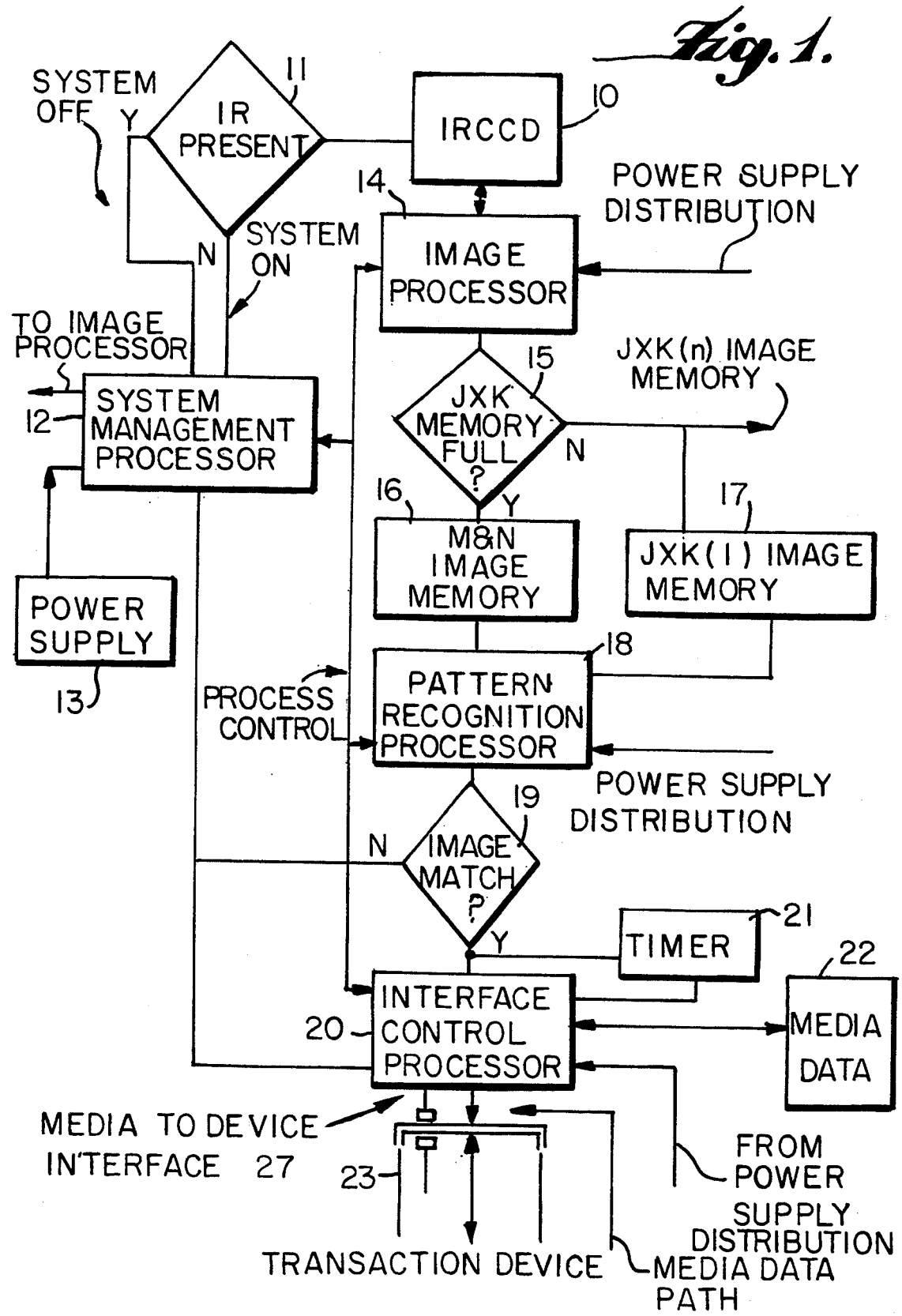
FIG. 1 illustrates a general flow diagram depicting four separate states of operation of the present invention.

Referring now to FIG. 1, as an individual is issued a transaction media with the present invention installed, the individual will place a selected finger over the IRCCD Detector Element 10. Logic Gate 11 will sense the presence of IR energy on the IRCCD Detector Element 10, and signal the System Management Processor 12 to apply power to the Image Processor 14 through the process interface connections. With no IR energy present, Logic Gate 11 will hold the device in the quiescent operating state.

With power applied to the Image Processor 14, the Image Processor 14 will invoke a software program to sample the IR energy level incident on each pixel of IRCCD Detector Element 10. As these IR energy levels are converted into scalar values, Logic Gate 15 will route the scalar values to either one or more permanent, J×K Image Memory 17 components or to a single M×N Image Memory 16 component depending upon if any scalar values have previously been stored within the J×K Image Memory 17 component(s).

If the memory areas within the J×K Image Memory 17 component(s) are empty, the scalar values will be routed to these memory areas and stored as permanent IR image record(s) of the individual(s) authorized to use the transaction media.

Given the J×K Image Memory 17 component(s) does contain permanent IR image record(s), Logic Gate 15 will route the scalar values from the Image Processor 14 to the M×N Image Memory 16 component, writing over any previously stored scalar values with new scalar values, retaining them as a temporary IR image record of the finger being imaged.

As the last scalar value is mapped to either the J×K Image Memory 17 component(s) or to the M×N Image Memory 16 component, the Image Processor 14 will signal the System Management Processor 12, through the internal process control interface, to both apply power to the Pattern Recognition Processor 18 and remove power from the Image Processor 14.

The Pattern Recognition Processor 18 contains software algorithms to compare one or more sections of scalar values from within the M×N Image Memory 16 component with corresponding, but larger section(s) of scalar values from within the permanent, J×K Image Memory 17 component(s). The software algorithms may represent any one of several existing pattern recognition techniques to accomplish the pattern matching process.

If the Pattern Recognition processor 18 does not confirm a pattern match, Logic Gate 19 will signal the System Management Processor 12 to disconnect system power from the Pattern Recognition Processor 18, thus returning the device to a quiescent operating state.

If the Pattern Recognition Processor 18 does confirm an image match, Logic Gate 19 will signal the System Management Processor 12 to apply power to the interface Control Processor 20 and disconnect power from the Pattern Recognition Processor 18. The Interface Control Processor 20 will then activate the Timer 21 and generate an electronic coupling signal for use in completing a circuit path between the Transaction Media 23, as illustrated in FIG. 2, and the corresponding Transaction Device 22, as illustrated in FIG. 1.

The Interface Control Processor 20 will hold the electronic coupling signal on until either the Timer 21 period elapses, indicating a physical coupling between the Transaction Media and the Transaction Device 22 has not been established, or until the physical coupling between the Transaction Media and the Transaction Device 22 has been broken given the physical coupling has been established. The Interface Control Processor 20 will also maintain the Media To Device Enabling signal beyond the Timer 21 period while the physical coupling between the Transaction Media and the Transaction Device 22 is maintained.

The Interface Control Processor 20 will signal the System Management processor 12, through the internal process control interface, to remove system power from the Interface Control Processor 20 given any of the above mentioned conditions are met, thus returning the device to its quiescent operating state.

Figure 2A:
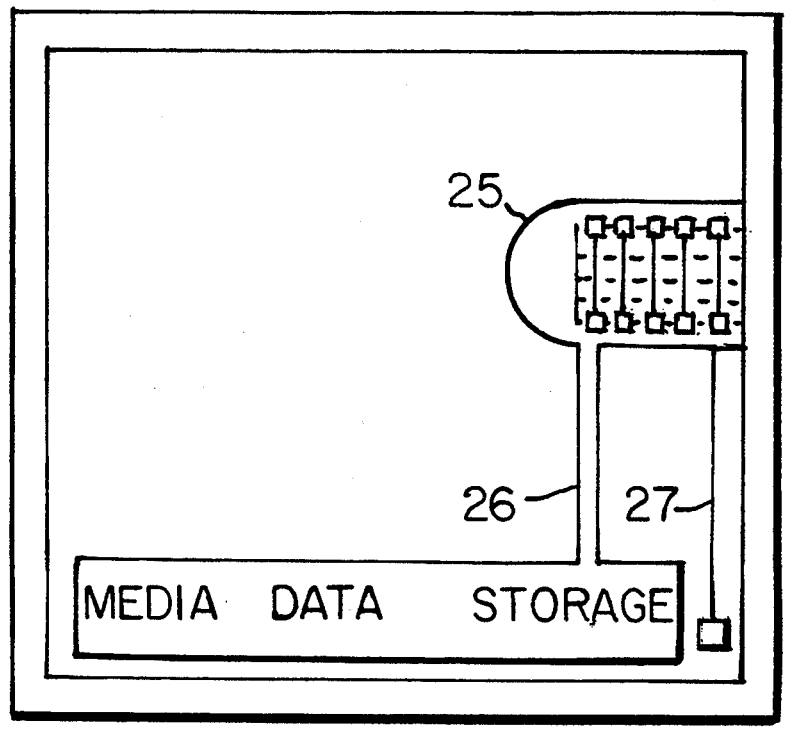
FIG. 2a illustrates a plan view of the present invention.
Figure 2B:
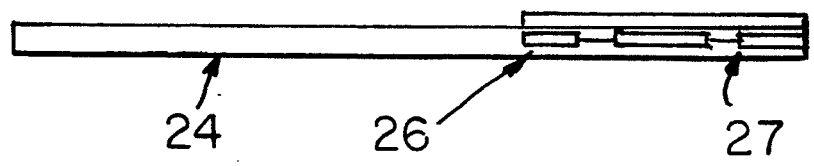
FIG. 2b illustrates a side view of the invention.

Referring now to FIG. 2, the present invention combines the electronic components into a single Application Specific Integrated Circuit (ASIC) component 24. The ASIC 24 component would be surface mounted onto a thin wafer 26 of such dimensions that it may be installed directly onto or between the plastic layers of common Transaction Media 23, such as a credit card.

As this thin wafer is embedded within a Transaction Media 23, the ASIC 24 will serve as an indication and a physical guide 26 for where and how an individual is to position their finger over the device. This physical guide 26 will be of such dimensions as to limit the range of finger positioning over the device and subsequently reduce the processing time required for the device to verify the identity of an individual attempting to use the transaction media.

Each state of operation is controlled by the specific processor element with the system management processor 12 controlling the entire system. As each state processor element operates independent of each other state processor element, the design arrangement illustrated in FIG. 1 could be separated into four separate flow diagrams, each illustrating the independent operation of each processor element and each state of operation. Therefore, the function of the present invention, as illustrated in FIG. 1 can vary in terms of form and fit, as required by a particular application.

The precise physical arrangement of blood vessels, veins, and capillaries within the human body constitutes an attribute of personal uniqueness different for each individual. Some security systems use this attribute of personal uniqueness for controlling access into sensitive areas. This is done by optically matching the pattern of blood vessels within an individual's retina with a pattern of the same individual's retina previously stored within the security system's operating system. The system of the present invention uses this same attribute of personal uniqueness but with the Infra-Red (IR) imaging process and pattern recognition technique.

The human body is a natural radiator of IR energy. The amplitude of IR energy emanating from adjacent locations on the human body will vary in relation to the spatial arrangement of blood vessels, veins, and capillaries. Simply stated, the amplitude of IR energy will be greater when observed at a point directly over a blood vessel while less IR energy will be observed at a point between the blood vessels.

If these IR amplitude values are mapped along adjacent points over a localized area of the body, a distinct amplitude pattern will be created corresponding to the spatial arrangement of blood vessels within the sampled area. These IR amplitude patterns, corresponding to the spatial arrangement of blood vessels, will be unique to every individual just as the physical arrangement of blood vessels are unique to each individual.

The system of the present invention uses the IR image pattern being generated from the human finger as the attribute of personal uniqueness required to meet the stated objectives. The IR Image of an individual's finger is obtained from an Infra-Red Charge Coupled Device (IRCCD) 10 and processed within a device having four states of operation. These states of operation are Quiescent, Imaging, Pattern Recognition, and Interface Control.

The system may use either separate special purpose processors and software with each state of operation or may have a single special purpose processor with software partitioning for each state of operation. In either case, another special purpose processor, the System Management Processor 12, is used to control the transition between each state of operation by logically applying and removing power from each respective state processor.

The System Management Processor 12 transitions the device from a quiescent state of operation into the imaging state of operation and returns the device back to a quiescent state from either the pattern recognition or interface control state of operation. These transitions will occur based upon certain logical conditions that result during state processor operation. The System Management Processor 12 enables a sequential transition to each state of operation using alternate logical conditions that would have otherwise returned the device back to its quiescent state of operation.

In the quiescent state of operation, only the System Management Processor 12 is active. When the presence of IR energy is sensed at the IRCCD component 10, the logic circuit 11 will signal the System Management Processor 12 to apply the system power to the Image Processor component 14. Without sending the presence of IR energy at the IRCCD component 10, the device will remain in the quiescent state of operation.

The imaging state of operation is entered only from the quiescent state of operation as controlled by the System Management Processor 12. As the System Management Processor 12 enables system power to be applied to the Image Processor component 14, software algorithms within the Image Processor Component 14 will sequentially sample the amplitude energy levels at every pixel of the IRCCD 10 and map them as scalar values to either a set of permanent memory components or to a temporary memory component. The logic component 15 controls the direction of scalar values based upon the presence of scalar values within the permanent memory components. As the final pixel is sensed and mapped to either memory component, another logic component will signal the System Management Processor 12 to remove system power from the Image Processor component 14 and apply system power to the Pattern Recognition Processor 18.

The pattern recognition state of operation is entered only from the imaging state of operation as controlled by the System Management Processor 12. As the System Management Processor 12 enables system power to be applied to the Pattern Recognition Processor component 18, software algorithms within the Pattern Recognition Processor 18 will compare one or more of the permanently stored IR image patterns with the current IR image pattern stored within the temporary memory component of the device. If the Pattern Recognition Processor 18 confirms a pattern match does exist, by way of logic 19, between the images stored within the permanent and temporary memory storage components, a logic component will signal the System Management Processor 12 to apply system power to the Interface Control Processor 20 and remove system power from the Pattern Recognition Processor 18. If a pattern match is found not to exist, the same logic gate 19 will signal the System Management Processor 12 to remove system power from the Pattern Recognition Processor 18 component and return the device to its quiescent state of operation.

The interface control state of operation is entered only from the pattern recognition state of operation and only with identity verification as confirmed during the pattern recognition state of operation. As the System Management Processor 12 enables system power to be applied to the Interface Control Processor component 20, software algorithms within the Interface Control Processor component 20 will both activate the electronic timer component 21 and generate the electronic coupling signal from the Interface Control Processor 20 to one or more source contacts on the transaction media 24.

The electronic timer component 21 will maintain the presence of this electronic coupling signal for a short period of time, allowing for the transaction media 24 to be physically coupled with the transaction device 23. If the short time duration elapses before this physical coupling takes place, a logic component will signal the System Management Processor 12 to remove system power from the Interface Control Processor component 20, thereby removing the electronic coupling signal and returning the device back to a quiescent state of operation. If the transaction media 24 is physically coupled to the transaction device 23 before the time duration elapses, the Interface Control Processor component 20 will maintain the electronic coupling signal beyond the fixed time duration for as long as the transaction media 24 remains physically coupled to the transaction device 23.

The physical construction of the present invention includes one or more exposed contacts originating from the Interface Control Processor component 20. As the transaction media 24 is physically coupled to the transaction device 23, these contacts will complete a circuit path from the Interface Control Processor component 20, through the transaction device 23, and back to the Interface Control Processor component 20. While this circuit path remains intact, the Interface Control Processor component 20 will hold the device in the interface control state of operation.

The type of electronic coupling signal being sent to a transaction device 23 from the transaction media 24 with the present invention installed may vary according to application. It may be a simple voltage signal designed to briefly activate a light indicator on a credit card imprint device or may have a more complex function as warranted by the specific transaction system.

A feature of the present invention, however, is that this electronic coupling signal will only be present if the system has verified an individual's identity. Likewise, the transaction device 23 designed for use with a transaction media 24 having the present invention installed, will only allow an individual to exchange services from a transaction device 23 if this electronic coupling signal is present.

While the above description contains many specificities, these should not be construed as limitations on the scope of the invention, but rather as exemplification of one preferred embodiment thereof. Many other variations are possible. For example, each of the elements described, or two or more together, may find useful application in other types of methods different from the type described. Accordingly, the scope of the invention should be determined not by the embodiment illustrated, but by the appended claims and their legal equivalents.

I claim:

1. An identification and verification interface system for use between a transaction media and a transaction device said interface system comprising:
    a single application specific integrated circuit, said circuit including
    an infra-red charge coupled device for sensing infra-red energy emanating from only a large concentration of nerve endings and associated blood vessels, and charge coupled device sending a signal indicating a detection of the large concentration of nerve endings and associated blood vessels;
    a system management processor connected to said infra-red charge coupled device and receiving said indicating signal, said system management processor for controlling the identification and verification interface;
    an image processor connected to said system management processor and receiving a power up signal from said system management processor based on receipt of said indicating signal, said image processor sending a sample of each infra-red energy level signal to said infra-red charge coupled device;
    conversion means for receiving each sampled infra-red energy level from said infra-red charge coupled device and for converting each sampled infra-red energy level into a scaler value;
    memory means for storing infra-red image records of only said large concentration of nerve endings and associated blood vessels authorized to utilize the transaction device;
    comparison means connected to said conversion means and to said memory means, said comparison means comparing the scaler values with said stored infra-red image record and sending a comparison result signal to said system management processor; and
    interface control processor connected to said system management processor for receiving power upon receipt of said comparison result signal, said interface control processor issuing a coupling signal to couple the transaction media with the transaction device for a specific time period if said comparison result signal is favorable and issuing a power down signal if said comparison result signal is unfavorable.

2. The identification and verification interface system of claim 1, wherein said interface includes means for mounting said integrated circuit on said transaction media.

3. The identification and verification interface system of claim 1, wherein said interface includes logic means connected to said infra-red charge coupled device for holding said device in a quiescent operating state at times other than sensing of the large concentration of nerve endings and associated blood vessels.

4. The identification and verification interface system of claim 1, wherein said memory means includes
    at least one permanent memory for storing in sections said permanent infra-red image records;
    at least one temporary memory for storing said scaler values in sections as temporary infra-red image records.

5. The identification and verification interface system of claim 4, wherein said interface includes
    pattern recognition processor for comparing one or more sections of said temporary infra-red image records with corresponding sections of said permanent infra-red image records.

6. The identification and verification interface system of claim 5, wherein said pattern recognition processor further comprises
    pattern match means for confirming an image match, said pattern match means signalling said system management processor to apply power to said interface control processor and to power down said pattern recognition processor.

7. The identification and verification interface system of claim 1, wherein said image processor signals said system management processor when the last scaler value is stored in said memory means; and
    said system management processor having power down means for powering down said image processor upon receipt of said last scaler value stored signal.

8. The identification and verification interface of claim 1, wherein said interface includes timer means for establishing said predetermined time period.

9. The identification and verification interface of claim 8, wherein said interface control processor includes
    means for holding the electronic coupling signal until at least one of the following occurs: a.) said predetermined period lapses, b.) a physical coupling between said transaction media and transaction device is not established, or c.) the physical coupling between the transaction media and the transaction device has been established and has been broken.

10. The identification and verification interface of claim 1, wherein said large concentration of nerve endings and associated blood vessels can be a finger, nose, ear lobe or other part of the human body.

* * * * *